June 12, 1934.  H. T. FAUS  1,962,929
MEASURING INSTRUMENT
Filed April 4, 1933

Inventor:
Harold T. Faus,
by Charles E. Tullar
His Attorney.

Patented June 12, 1934

1,962,929

UNITED STATES PATENT OFFICE 1,962,929

MEASURING INSTRUMENT

Harold T. Faus, Lynn, Mass., assignor to General Electric Company, a corporation of New York Application April 4, 1933, Serial No. 664,372

5 Claims. (Cl. 171—95)

My invention relates to measuring instruments and has for its principal object the provision of a simple, rugged, relatively inexpensive, compact, easily assembled construction for an electrical instrument.

Another object is to provide a highly effective, easily manufactured magnetic damping system for measuring instruments which is shielded from stray fields and when used with electrical instruments inherently shields the movement of the instruments from the damping magnet.

In accordance with my invention in its preferred form, a pair of straight bar magnets are used to supply the field for a magnetic damping system and a yoke of relatively permeable material serves both as a shielding member and as a flux path to pole pieces cooperating with free poles of the bar magnets. The damping vane oscillates in parallel airgaps, each formed between one of the poles of one of the bar magnets and one of the pole pieces.

Figure 1:
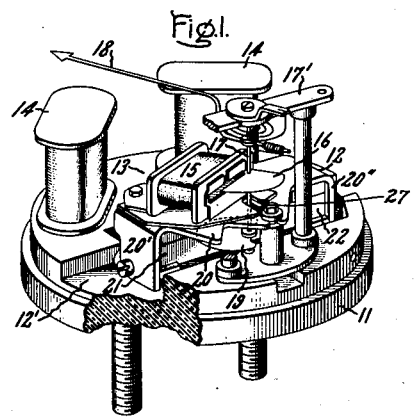
Figure 2:
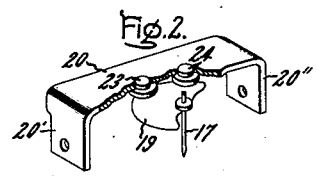
Figure 3:
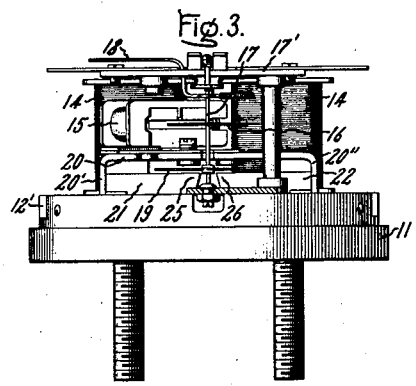

The features of my invention which I believe to be novel and patentable are pointed out in the claims appended hereto. A better understanding of my invention however may be obtained by referring to the following description in connection with the accompanying drawing in which Fig. 1 illustrates in perspective with its cover removed one form of construction for electrical instruments in accordance with my invention; Fig. 2 is a detailed view in perspective of a portion of the damping system; and Fig. 3 is an elevation partially in section of the construction shown in Fig. 1.

Referring now more in detail to the drawing in which like reference characters refer to like parts throughout, the apparatus is mounted on a base 11 which may if desired be circular in shape for the sake of maximum compactness. A damping system 12 is mounted on the front half of the circular base 11 and may if desired be partially sunk into a recess 12' in the base 11. An instrument unit 13 is mounted above the damping unit 12 and may if desired be attached thereto.

The remaining quadrants of the circular base 11 are occupied by resistors 14 which may be connected in series with the instrument unit or in shunt thereto, depending upon the type of instrument, for customary purposes of limiting the current flowing in the windings of the instrument. The instrument unit 13, in the arrangement here shown by way of illustration comprises two reacting elements, a relatively flat rectangular current-conducting coil 15 and a suitably cam-shaped magnetic vane 16 cooperating therewith, but it will be understood that my invention is not limited to any particular type of instrument. The movable magnetic vane 16 is carried by a shaft 17 mounted in a suitable supporting arrangement 17'. The shaft 17 also carries a pointer 18 cooperating with a scale of any suitable type which has been omitted from the drawing for the sake of clarity. It will be understood that the instrument is also preferably provided with a cylindrical cover which has also been omitted from the drawing for the sake of clarity.

The shaft 17 also carries a vane 19 of conducting material which may if desired comprise an approximately semi-circular sheet of relatively high conductivity and low specific gravity material such as aluminum. The damping system includes a flattened inverted U-shaped yoke member or saddle 20 of relatively permeable magnetic material and a pair of relatively short bar magnets 21 and 22 composed of a material having a relatively high coercive force. Although any suitable material may be employed I have found cobalt steel (e. g., 46% cobalt) or aluminium-nickel steel (e. g., 6–15% aluminium, 20–30% nickel) to be satisfactory for this purpose. Each of the bar magnets 21 and 22 has one of its ends abutting one of the transverse projections 20' and 20" of the saddle 20. The adjacent ends 25 and 26 of the bar magnets forming the free poles thereof are slightly spaced and preferably have their end faces slightly oblique sloping outwardly and downwardly so as to make the strength of magnetic pole relatively strong at the upper surface of the magnets 21 and 22 at the adjacent ends. The saddle 20 may if desired have mounted therein circular pole pieces 23 and 24 placed opposite the free poles 25 and 26 of the bar magnets 21 and 22.

The spaces between the faces of the pole pieces 23 and 24 and the upper surfaces of the bar magnets 25 and 26 form airgaps within which the damping vane 19 is free to oscillate as the shaft 17 is caused to rotate in the operation of the instrument. As will be well understood by those skilled in the art, the counter forces produced by the cutting of the lines of magnetic flux in the damping airgaps by the damping vane 19, as it oscillates, tend to damp out the vibrations of the moving element. It will be apparent that the shape of the saddle 20 causes it to shield the bar magnets 21 and 22 from external or stray magnetic fields which may have the tendency of demagnetizing the bar magnets 21 and 22. The saddle 20 also shields the instrument unit 13 from the magnetic field produced by the bar magnets 21 and 22. Consequently, a fully shielded arrangement is provided for a compact instrument. The arrangement also has the advantage that the bar magnets 21 and 22 may be magnetized after the instrument is assembled by subjecting the bar magnets to a very strong magnetic field which obviously saturates the saddle 20, so as to permit magnetic flux to flow through the bars 21 and 22 thereby magnetizing them.

In accordance with the provision of the patent statutes I have described the principles of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. A damping arrangement for an electrical instrument having a rotatably movable member, comprising a damping vane composed of a sheet of electrically conducting material substantially in the shape of a segment of a circle mounted upon said movable member at its lower end perpendicular to its axis of rotation, and a damping magnet, said damping magnet comprises a pair of short bar magnets of high coercive force material placed below said vane parallel thereto with their axes in the same line but with a short airgap between adjacent ends, a yoke member composed of magnetic material having greater permeability than said bar magnets, said yoke member joining the opposite ends of said bar magnets, and a pair of flat circular pole pieces of magnetic material attached to the lower side of said yoke member at points respectively opposite the respective portions of said bar magnets forming free poles, thereby creating a magnetic field through said damping vane serving to damp oscillations thereof, said yoke member serving to shield said bar magnets from stray fields and said instrument from said bar magnets.

2. A damping arrangement for an electrical instrument having reacting elements, one of which is rotatably movable, comprising a damping vane attached to said movable element perpendicular to its axis of rotation, a flattened U-shaped yoke of magnetic material having a straight central portion parallel to said damping vane in relatively close proximity located between said vane and the reacting elements of said instrument, and a pair of bar magnets placed with a spacing between one end of one bar magnet and one end of the other and with their opposite ends respectively in contact with the arms of said U-shaped yoke member, said bar magnets also being substantially parallel to said damping vane located in relatively close proximity thereto but on the side thereof away from the said reacting elements of said instruments whereby said magnetic field is caused to pass transversely through said disk from the free ends of said bar magnets to the central portion of said yoke member effecting the damping of the oscillations of said damping vane.

3. A damping arrangement for an instrument having a rotatably movable member comprising a damping vane mounted upon said movable member perpendicular to the axis of rotation thereof, a pair of bar magnets placed with a spacing between one end of one bar magnet and one end of the other, and a yoke member composed of magnetic material having a higher permeability than said bar magnets joining the opposite ends of said bar magnets and having a central portion substantially parallel to said bar magnets and spaced therefrom to form a pair of airgaps between the free pole portions of said bar magnets and the central portions of said yoke member where magnetic poles are induced, within which airgaps said damping vane is located.

4. A damping arrangement for an instrument having a rotatably movable member comprising a damping vane mounted upon said movable member perpendicular to the axis of rotation thereof, a pair of bar magnets placed with a spacing between one end of one bar magnet and one end of the other, a yoke member joining the opposite ends of said bar magnets having a central portion substantially parallel to and spaced from said bar magnets, and a pair of pole pieces attached to the central portion of said yoke member opposite the respective free ends of said bar magnets, thereby forming a pair of airgaps within which said damping vane is located and is free to oscillate and causing a flux to pass through said damping vane to damp the oscillations thereof.

5. An electrical instrument comprising a circular base, a pair of series resistors mounted upon said base in adjacent quadrants, a damping unit mounted upon said base in a recessed portion thereof in the remaining half of said base, said damping unit including a pair of bar magnets placed with a spacing between one end of one bar magnet and one end of the other, and a flattened inverted U-shaped saddle of magnetic material magnetically joining the opposite ends of said bar magnets to provide magnetic flux in the airgap between the middle of said saddle and the adjacent ends of said bar magnets, and a movable member comprising a damping vane cooperating with said damping unit and located between the middle of said saddle and said bar magnets parallel therewith, and an actuating vane cooperating with said current-conducting coil.

HAROLD T. FAUS.